July 10, 1973     J. B. McCORMICK     3,745,091

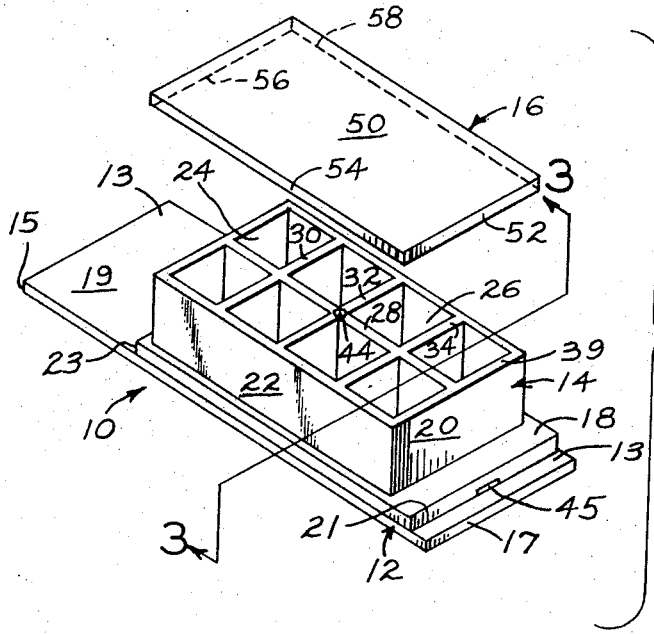

BIOLOGICAL REACTION CHAMBER APPARATUS

Filed Nov. 18, 1970     2 Sheets-Sheet 2

INVENTOR

JAMES BENJAMIN MC CORMICK

BY *Louis E. Davidson*

ATTORNEY

United States Patent Office 3,745,091
Patented July 10, 1973

3,745,091
BIOLOGICAL REACTION CHAMBER APPARATUS
James Benjamin McCormick, Hinsdale, Ill., assignor to Miles Laboratories, Inc., Elkhart, Ind.
Filed Nov. 18, 1970, Ser. No. 90,748
Int. Cl. C12b 1/00
U.S. Cl. 195—139                                    3 Claims

ABSTRACT OF THE DISCLOSURE

Biological reaction chamber apparatus having a bottom wall sidewalls which is useful, for example, to produce a tissue culture directly on a base, such as a microscope slide, for subsequent examination and storage comprises in combination a base which forms the bottom of said chamber and a receptacle removably adhesively attached in liquid-impermeable contact to said base which receptacle forms the sidewalls of said chamber. In one use of this apparatus, a liquid tissue culture medium can be placed in the receptacle chamber in contact with the base, the medium is incubated to allow the tissue culture to grow and to attach such growth to the base. The liquid medium is then removed from the chamber, and the receptacle is removed from the base. The tissue culture growth on the base can then be treated as desired and microscopically examined.

BACKGROUND AND PRIOR ART

It is frequently desirable in medical laboratory practice as well as in biological research to grow various cells or tissues in particular media and then to examine the resulting growth. A particularly major use of this technique is in virology laboratories where host cells are grown and then used to detect viral activity.

In general, the prior art tissue cultures were obtained in the following manner. A known measured amount of liquid growth medium containing a suspension of the cells to be grown was placed in a sterilized glass test tube. The tube was then sealed with a non-toxic stopper and placed on its side in an appropriate rack and oriented so that the area of cell attachment and growth was always immersed in a nutritional fluid environment. The tube was then incubated until a complete cell monolayer was grown. The tube was then examined microscopically to check for growth and then again to check for any cytopathologic changes induced by any experimental treatment during such growth.

In order to obtain a permanent stained slide of any such cytopathologic changes which occurred during the above growth, a second cell culture must be prepared. A cleaned glass coverslip was placed in a specially modified glass tube and a portion of liquid growth medium containing a suspension of the cells to be grown was placed in the tube in contact with the coverslip. The tube was then sealed and incubated as described above to grow a cell monolayer on the coverslip. The same experimental treatment was repeated to affect the same cytopathologic changes. When the desired cell growth and changes were accomplished, the coverslip was removed from the tube, rinsed, fixed and stained. The strained coverslip was then mounted on a microscope slide for subsequent examination and storage.

This prior art technique required many manipulative steps and complex apparatus in order to produce stained tissue cultures on microscope slides.

In addition to the production of tissue cultures, there are other biological procedures which are carried out in reaction chambers using complex and cumbersome prior art apparatus.

It is an object of the present invention to provide improved biological reaction chamber apparatus.

SUMMARY OF THE INVENTION

In accordance with the present invention, biological reaction chamber apparatus useful for carrying out biological reactions, such as growing tissue cultures therein, is provided which comprises in combination a base member and a cooperable receptacle having sidewalls and an end opening surrounded by an end surface, said end surface being removably mated in liquid-impermeable contact with said base, whereby said base member forms the bottom wall and said sidewalls of said receptacle form the sidewalls of said biological reaction chamber apparatus.

DESCRIPTION OF THE DRAWINGS

FIG. 1 is a partially-exploded perspective view of one embodiment of the present invention;

FIG. 2 is an enlarged plan view of the underside of the receptacle 14 of FIG. 1;

FIG. 3 is a vertical cross-section view taken along line 3—3 of an unexploded form of FIG. 1 wherein liquid growth media are contained within the apparatus:

DESCRIPTION OF THE INVENTION

Figure 4:
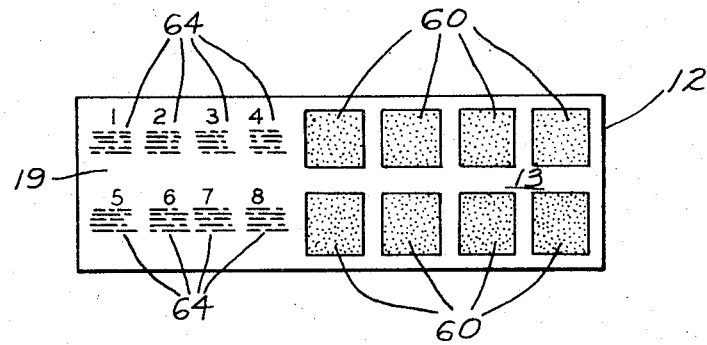
FIG. 4 is a plan view of a microscope slide having tissue cultures attached thereto which were prepared using apparatus of the present invention.

Referring to FIG. 1, the biological reaction chamber apparatus 10 of the present invention comprises in part a base member 12 having a planar upper surface 13 and opposing end faces 15 and 17 which are normal to surface 13. A receptacle 14 is located near end face 17 and mates against surface 13 of base member 12 so as to leave a substantial portion 19 of surface 13 exposed near end face 15. This free surface area 19 can be etched so as to render it capable of receiving appropriate identification markings, or an appropriate label can be affixed to this free surface area. A cover 16 capable of fitting over and closing the top of the receptacle 14 is shown in exploded relation above receptacle 14.

Base member 12 is preferably a glass microscope slide when the biological reaction chamber apparatus 10 is intended to be used for tissue culture. Such microscope slide is preferably fabricated from soda glass which has been cleaned to remove oils, greases, surfactants, abrasives or other materials inhibitory to biological growth. Upper surface 13 of base member 12 must be reasonably flat to form a mating surface for receptacle 14. Glass microscope slides useful in the present invention are marketed by the Erie Scientific Co. under the designations ESCO No. 2955–F or No. 3A. It is understood that other materials, such as sintered alumina, organoplastics and the like, can also be used for the base member 12 for biological reaction chamber apparatus of the present invention, providing such materials are appropriately cleaned and do not inhibit the desired biological reaction.

Receptacle 14 is formed of upstanding sidewalls 22 and 26 and upstanding endwalls 20 and 24 and at its base said receptacle 14 is formed with a peripheral outwardly directed flange 18 which has end faces 21 and 23. As shown in FIG. 1, receptacle 14 is also formed with a longitudinally extending partition 28 which is parallel to and spaced equidistant from sidewalls 22 and 26 and with transverse partitions 30, 32 and 34 which are parallel to each other and to endwalls 20 and 24 and normal to partition 28. Partition 32 is spaced equidistant from endwalls 20 and 24. Partition 30 is spaced equidistant from endwall 24 and partition 32, while partition 34 is spaced equidistant from endwall 20 and partition 32. The partitions form a unitary structure with the side and endwalls and define cubical chambers in receptacle 14. The upper edges of the sidewalls, the endwalls, and the partitions are coplanar and form therewith a planar surface 39 along the top of receptacle 14. The lower edges of the partitions are coplanar with the lower edges of said side and endwalls as well as with the lower surface of flange 18, forming therewith a planar bottom surface 40 for the receptacle 14 as shown in FIG. 2. A central passage 44 is formed in partitions 28 and 32 at the junction thereof and extends vertically from upper surface 39 to the bottom surface 40. Receptacle 14 and cover 16 are preferably formed from transparent organoplastic materials. Useful organoplastic materials are polystyrene, polypropylene, Celluloid, polymethacrylate, polymethylmethacrylate and the like.

As shown in FIG. 2, bottom face 40 is formed with a rectangular groove 42 which has side and end portions in general alignment with the side and endwalls of receptacle 14. A longitudinal groove 36 is formed in the surface 40 in general alignment with partition 28, the transverse grooves 37, 38 and 41 are formed in surface 40 in general alignment with transverse partitions 30, 32 and 34, respectively as shown. Grooves 37, 38 and 41 communicate with grooves 36 and 42 as shown and groove 36 communicates with groove 42 as shown. Central vertical passage 44 forms an injection port which communicates directly with grooves 36 and 38 and thus with grooves 37, 41 and 42. Slots 45 and 47 are formed in bottom face 40 and communicate respectively between groove 42 and end faces 21 and 23.

Cover 16 comprises a planar top wall 50 with depending edge walls 52, 54, 56 and 58 which are all substantially normal to the top wall. The dimensions of the cover top and depending edge walls are such that when the cover 16 is placed in operative position on receptacle 14, the depending edge walls have a loose telescopic fit with respect to the outer surfaces of the sidewalls and endwalls of receptacle 14, allowing the cover 16 to be easily removed and replaced when desired. Upper planar surface 39 of receptacle 14 mates against the undersurface of top wall 50 when the cover 16 is placed on said receptacle.

In the fabrication of the biological reaction chamber apparatus of the present invention, the bottom face 40 of receptacle 14 is mated against surface 13 of base member 12 near end face 17 and clamped thereto by suitable devices not shown, the mating surfaces having been previously cleaned. An adhesive gasket material in liquid or slurry form is then injected through central passage 44 to fill grooves 36, 37, 38, 41 and 42 with such material. Slots 45 and 47 act as vents to allow air in the grooves to escape as the gasket material enters. The gasket material is then allowed to solidify slowly at ambient temperature or more rapidly under heating conditions to form an adhesive gasket 48 (shown in FIG. 2) which provides a liquid-impermeable seal between the receptacle 14 and the base 12 at its point of contact therewith. When the injected gasket material 48 has solidified, the clamping devices can be removed and the receptacle 14 will be adhered to the base member 12 by means of the adhesive gasket 48. When desired at a subsequent time, the receptacle can be easily removed from the base by pulling it away from the base.

A preferred gasket material is an organopolysiloxane elastomer. An especially useful gasket material is an organo-polysiloxane elastomer composition marketed by the General Electric Co. under the designation RTV 630. This material is further described in U.S. Pat. No. 3,436,366. It is further preferred to remove entrapped air from the above RTV 630 material before it is used to form the gasket. This is conveniently accomplished by placing the material in a desicator and evacuating it to a vacuum of about 10–15 in. of mercury for about 20–30 min.

Other useful gasket materials are microcrystalline waxes and various synthetic organic elastomers. The principal criteria for a useful gasket are that it provide desired removably adhesive characteristics between the receptacle 14 and the base 12, provide a liquid-impermeable seal, be non-toxic to the biological material subsequently employed in the apparatus, and not act as a source of growth for microorganisms.

While it is preferable to form the gasket in the above-described manner, it is also suitable to coat bottom face 40 of receptacle 14, including the bottom edge faces of partitions 28, 30, 32 and 34 with the suitable gasket material and then place the coated receptacle in contact with surface 13 of base 12 to achieve the desired adhesive and sealing conditions.

After fabrication of the biological reaction chamber apparatus, it is then sterilized in any well-known manner, and the upper surface 39 of receptacle 14 is covered with sterile tape (not shown) or preferably with a sterile cover 16. The apparatus can then be stored until ready for use.

The novel biological reaction chamber apparatus of the present invention is employed in the following manner to grow tissue cultures, for example. The tape (not shown) or cover 16 is removed from the receptacle 14 to expose the chambers thereof. The desired liquid tissue culture medium 62 (FIG. 3) containing a suspension of cells to be grown is then placed into each of the chambers. As shown in FIG. 3, the adhesive gasket 48 forms a liquid-impermeable contact to both the receptacle 14 and the base 12 to prevent any leakage from or between chambers in receptacle 14. The same or different media and cells can be placed in the various chambers. The top of the receptacle 14 is then covered with tape (not shown) or cover 16. Appropriate identification markings are then entered on the free surface area 19 of base 12 to describe the contents of each of the chambers. The apparatus is then placed in a suitable incubator and is incubated under well-known conditions to carry out the tissue culture growth. If desired, suitable treatment is carried out on the media during this growth to achieve cytopathologic changes in the cells. As shown in FIG. 3, at the conclusion of the growth period a mass of tissue cells 60 is attached to base 12 in each of the chambers of receptacle 14. The cover 16 is then removed, the tissue culture medium is removed from each chamber by aspiration, for example, and the receptacle 14 is then removed from the base 12. The masses of tissue cells attached to the base are then rinsed and fixed on the base and the affixed tissue cultures are then treated with appropriate stains to stain the cultures.

The resulting base, such as a glass slide, having the general form shown in FIG. 4 can then be microscopically examined and stored for further use. In FIG. 4, the surface 13 of base 12, to which the stained tissue culture cells 60 are adhered, bears on the surface portion 19 the identifying markings 64. This permanent record of the results of the tissue culture growth can be produced through use of the apparatus of the present invention in a far simpler and more efficient manner than through the use of the techniques employed in the prior art.

The above description relates to a receptacle 14 containing eight chambers. It is understood that the present invention covers apparatus which contains at least one chamber and can contain any desired number of chambers.

Figure 5:
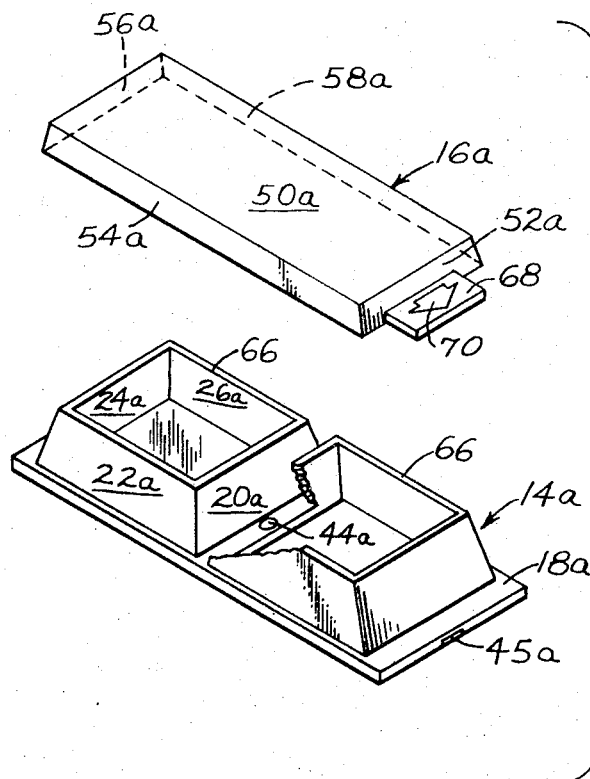
FIG. 5 is an exploded perspective view with a portion removed of another embodiment of part of the apparatus of the present invention.

A preferred form of the receptacle and cover is shown in exploded relation in FIG. 5, the receptacle having two chambers and being shown with a portion of one chamber cut away for convenience in description. Elements in FIG. 5 corresponding to similar elements in FIG. 1 will have the same reference numbers followed by the suffix *a*. Receptacle 14*a* has a base flange member 18*a* on which are formed a plurality of upstanding box-like receptacles 66 each having inwardly sloping sidewalls 22*a* and 24*a* and endwalls 20*a* and 24*a*. The base flange member 18*a* and receptacles 66 form a unitary structure. Base flange member 18*a* is formed with a central injection passage 44*a*, which serves the same function as the passage 44 of FIG. 1. The underside of base flange member 18*a* is formed with grooves (not shown) to accommodate gasket material surrounding the open lower ends of the receptacles 66, there being suitable communication between such grooves and the passage 44a. The sloping configuration of the walls of the receptacles 66 minimizes the possibility of cross-contamination when different biological materials, such as tissue culture growth media and cell suspensions, are separately introduced into adjacent receptacles 66. Receptacle 14a can be removably adhesively attached in liquid-impermeable relation to a base member 12 in the same manner as that described above for receptacle 14 of FIG. 1.

Cover 16a of FIG. 5 is dimensioned so that it loosely fits over the receptatcles 66 and covers the open upper ends thereof. Cover 16a has a tab or handle 68 projecting from depending end-wall 52a in a direction longitudinal to the cover 16a to assist in handling the cover. Tab 68 is formed with indicia thereon, such as the arrow 70, to indicate the direction in which the cover is placed on receptacle 14a. Whenever the cover is removed and subsequently replaced, the indica aid in orienting the cover in its original position. This also prevents cross-contamination between the receptacles 66 in the event the cover was reversed from its initial position when replaced.

The receptacles described above all have rectangular-shaped cross-sections. It is understood, however, that apparatus of the present invention can employ receptacles having other cross-sectional shapes, such as circular, for example.

What is claimed is:

1. Biological reaction chamber apparatus having a flat bottom wall, sidewalls extending therefrom, an open end opposite said bottom wall and with a cover removably closing said open end, comprising in combination (1) a flat base member, (2) a cooperable receptacle having sidewalls, a first end opening surrounded by a coplanar flat end surface and a second end opening opposite from said first end opening, said flat end surface surrounding said first end opening being formed with a groove means which surrounds said first end opening in which groove means an adhesive gasket is located, said receptacle also containing an injection port communicating with said groove means and through which said gasket material is capable of being injected to form the adhesive gasket in said groove means, said flat end surface surrounding said first end opening being removably mated in liquid-impermeable contact through said adhesive gasket with said flat base member, whereby said flat base member forms the flat bottom wall and said sidewalls of said receptacle form the sidewalls of said biological reaction chamber apparatus, and (3) a cover removably closing said second end opening of said receptacle.

2. Apparatus according to claim 1 wherein the receptacle includes wall means defining a plurality of chambers, each chamber having a first end opening surrounded by a coplanar flat end surface and a second end opening opposite from said first end opening, each of the flat end surfaces surrounding the plurality of first end openings being formed with a groove means in which all said groove means are in communication to form a unitary groove means and in which a unitary adhesive gasket is located, said receptacle also containing an injection port communicating with said unitary groove means.

3. Apparatus according to claim 1 wherein the adhesive gasket is formed from an organopolysiloxane elastomer.

References Cited
UNITED STATES PATENTS

| | | | |
|---|---|---|---|
| 3,055,808 | 9/1962 | Henderson | 195—139 |
| 3,234,107 | 2/1966 | Kaufman et al. | 195—139 |
| 3,630,849 | 12/1971 | Land | 195—139 |
| 3,203,870 | 8/1965 | Andelin | 195—139 |
| 3,165,450 | 1/1965 | Scheidt | 195—139 LE |
| 2,942,520 | 6/1960 | Rose | 195—139 |
| 3,301,769 | 1/1967 | Steel | 195—139 |
| 3,503,665 | 3/1970 | Carter | 195—139 |
| 2,834,456 | 5/1958 | Langer | 206—42 |
| 3,143,207 | 8/1964 | Wagner | 206—42 |
| 3,684,660 | 8/1972 | Kereluk et al. | 195—103.5 |

ALVIN E. TANENHOLTZ, Primary Examiner

U.S. Cl. X.R.

156—305, 69; 195—1.7; 220—21